US006974846B2

(12) United States Patent
Garrison et al.

(10) Patent No.: US 6,974,846 B2
(45) Date of Patent: Dec. 13, 2005

(54) HYDROLYSIS RESISTANT POLYESTER COMPOSITIONS AND RELATED ARTICLES AND METHODS

(75) Inventors: William E. Garrison, Albuquerque, NM (US); James Michael McKenna, Hockessin, NM (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/120,366

(22) Filed: May 3, 2005

(65) Prior Publication Data

US 2005/0197429 A1 Sep. 8, 2005

Related U.S. Application Data

(62) Division of application No. 10/421,471, filed on Apr. 23, 2003.

(60) Provisional application No. 60/376,820, filed on Apr. 29, 2002.

(51) Int. Cl.$^7$ ............................ C08K 3/38; C08K 5/55; C08L 63/00; C08L 63/02; C08L 67/03
(52) U.S. Cl. ...................... 523/445; 525/438; 525/444
(58) Field of Search ..................... 523/445; 525/438, 525/444

(56) References Cited

U.S. PATENT DOCUMENTS

| | | | |
|---|---|---|---|
| 3,193,522 A * | 7/1965 | Fischer et al. | 524/195 |
| 3,598,787 A * | 8/1971 | Herwig et al. | 524/184 |
| 3,723,568 A * | 3/1973 | Hoeschele | 525/438 |
| 3,816,307 A * | 6/1974 | Woods | 252/609 |
| 3,907,857 A * | 9/1975 | Mayerhoefer et al. | 558/293 |
| 4,000,109 A * | 12/1976 | Smith et al. | 524/405 |
| 4,222,926 A * | 9/1980 | Mizuno et al. | 524/34 |
| 4,687,802 A * | 8/1987 | Hepp | 524/411 |
| 4,713,407 A * | 12/1987 | Bailey et al. | 524/109 |
| 5,158,701 A * | 10/1992 | Asai et al. | 252/299.01 |
| 5,298,544 A * | 3/1994 | Goff | 524/405 |
| 5,384,347 A * | 1/1995 | Horacek | 524/100 |
| 5,596,049 A * | 1/1997 | Gallucci et al. | 525/438 |
| 5,698,631 A * | 12/1997 | Sigworth et al. | 525/122 |
| 6,027,818 A * | 2/2000 | McKenna | 428/481 |
| 6,248,814 B1 * | 6/2001 | Hironaka et al. | 524/80 |
| 6,465,067 B1 * | 10/2002 | Wang et al. | 428/35.7 |

FOREIGN PATENT DOCUMENTS

| | | | | |
|---|---|---|---|---|
| EP | 647674 A1 * | 4/1995 | | C08K 5/524 |
| JP | 54101851 A * | 8/1979 | | C08L 67/02 |
| JP | 57047347 A * | 3/1982 | | C08L 67/02 |
| JP | 62041967 A * | 2/1987 | | F02M 69/00 |
| JP | 07102153 A * | 4/1995 | | C08L 67/00 |
| JP | 07125498 A * | 5/1995 | | B23B 23/00 |
| JP | 07138355 A * | 5/1995 | | C08G 63/91 |
| JP | 08142510 A * | 6/1996 | | B41M 5/26 |
| JP | 09194699 A * | 7/1997 | | C08L 67/02 |
| JP | 09194743 A * | 7/1997 | | C08L 101/00 |
| JP | 09208816 A * | 8/1997 | | C08L 67/02 |
| JP | 11153226 A * | 6/1999 | | F16J 3/04 |
| JP | 2000159985 A * | 6/2000 | | C08L 67/02 |
| JP | 2001247752 A * | 9/2001 | | C08L 67/02 |
| WO | WO 9634047 A1 * | 10/1996 | | C08K 13/00 |

* cited by examiner

Primary Examiner—Robert Sellers

(57) ABSTRACT

Polymer compositions comprising polyester, boron component, and epoxy component. Articles made from these compositions, particularly articles requiring excellent hydrolysis resistance properties.

3 Claims, No Drawings

HYDROLYSIS RESISTANT POLYESTER COMPOSITIONS AND RELATED ARTICLES AND METHODS

CROSS REFERENCE TO RELATED APPLICATIONS

This application is a divisional of U.S. application Ser. No. 10/421,471, filed Apr. 23, 2003, allowed and claims the benefit of U.S. Provisional Application No. 60/736,820, filed Apr. 29, 2002.

FIELD OF INVENTION

The field of invention relates to thermoplastic polyester compositions, and in particular, to hydrolysis resistant thermoplastic polyester compositions and applications made therefrom.

BACKGROUND OF INVENTION

Increasing requirements for hydrolysis resistance of polyesters, especially those requirements proposed by the automotive industry, have made it increasingly important to be able to provide thermoplastic polyester compositions having even better resistance to hydrolysis compared to currently available compositions or those described in the existing art.

Hydrolysis resistance of thermoplastic polyesters can be improved by the addition of an epoxy material. However, when incorporated at the high levels necessitated by current hydrolysis resistant requirements, an epoxy material often has the disadvantage of increasing melt viscosity or even increasing the rate of viscosity increase during melt processing, both of which are detrimental to performance in melt fabrication operations such as injection molding.

Japanese Patent Application No. 09208816 A discloses a composition containing, inter alia, polyester resin (particularly of the ethylene terephthalate type), a compound containing at least two epoxy groups and/or an epoxy resin, and carbon black. However, this reference does not specifically disclose in; any of the examples the use of both an epoxy resin and epoxy compound, does not disclose the relative ratios of epoxy resin to epoxy compound, if both are to be used, and does not disclose improved hydrolysis resistance when using both.

U.S. Pat. No. 5,596,049 discloses a composition containing, inter alia, linear polyester and difunctional epoxy compounds, particularly those having at least one of the epoxides on a cyclohexane ring. A potential drawback to using cyclohexane ring-based epoxides, however, is the high volatility of such epoxides that are currently available.

It is desirable to obtain a polyester composition that has improved hydrolysis resistant properties while avoiding the above-described drawbacks.

Several patent documents disclose the use of various borates in polyester compositions:

U.S. Pat. No. 4,713,407 discloses a composition comprising, inter alia, 100 wt % polyethylene terephthalate, 10–25 wt % halogenated flame retardant, and 3–10 wt % zinc borate. It is disclosed that the polyester composition is used for mouldings for car parts and home electric appliances and has flame resisstance combined with heat resistance, moldability, and good mechanical properties.

JP 09194699 A (Abstract) recites a thermoplastic resin composition comprising a composition comprising, inter alia, polybutylene terephthalate; a composition comprising, inter alia, glass fibres; and a composition comprising, inter alia, zinc borate. Disclosed advantages are improved mechanical properties and little warpage, giving molded articles having high dimensional accuracy.

WO9634047 A1 discloses a flame-retardant composition comprising polyester; an oxalate compound; and an inorganic compound selected from a group including borates.

JP 08142510 A (Abstract) recites a housing material for laser marking comprising a thermoplastic resin composition which is prepared by mixing 0.001–10 wt % of borate with a thermoplastic resin. The recited advantage is that a sharp black marking can be performed without inhibiting the balance among the tracking resistance, the flame retardant, and the dielectric breakdown strength.

JP 06025463 A (Abstract) discloses an anti-inside blocking additive comprising aluminum borate, preferably in particulate form having an average particle diameter of 0.1–50 microns or in lamellar crystalline form. A resin film, such as film made from polyethylene terephthalate, may contain this additive. The resulting advantages, it is disclosed, are excellent sliding and anti-inside blocking properties.

However, none of the above-reference patent documents disclosing borates is directed to improving hydrolysis resistance.

JP 07102153 A (Abstract) recites a composition containing a thermoplastic polyester resin, an epoxy resin, a silane coupling agent and an inorganic filler. In an example, it is disclosed that a mixture of polybutylene terephthalate and novolak epoxy resin were mixed with aluminum borate whisker, which had a fiber diameter of 0.5–1.0 microns and a length of 10–20 microns. JP 62041967 B (Abstract) recites a flame-retarding resin composition comprising polyester; a very specific modified epoxy compound; inorganic flame-retarding auxiliary agent; and reinforcing agent. The inorganic flame-retarding auxiliary agent may be barium metaborate. Neither of these abstracts, however, discloses the use of those compositions for hydrolysis resistant applications.

SUMMARY OF INVENTION

My invention includes polymer compositions comprising polyester, boron component, and epoxy component. My invention also includes articles made from such compositions, preferably molded articles in which hydrolysis resistance is desired.

DETAILED DESCRIPTION OF PREFERRED EMBODIMENTS

Polymer compositions of our invention comprise (a) polyester; (b) boron component; and (c) epoxy component.

Polyester

Compositions of our invention comprise at least one polyester.

Total polyester comprises preferably between about 20 and about 99.5 weight percent of the composition, more preferably between about 40 and about 99 weight percent of the composition, and even more preferably between about 60 and about 98 weight percent of the composition. Of course, total polyester can comprise the balance of the composition, after the amounts of epoxy component, boron component, and any other optional components (not limited to those discussed below) are factored in.

Preferred polyesters include polymers which are, in general, linear saturated condensation products of glycols and dicarboxylic acids, or reactive derivatives thereof. Preferably, polyesters comprise condensation products of aromatic dicarboxylic acids having 8 to 14 carbon atoms and at least one glycol selected from the group consisting of neopentyl glycol, cyclohexane dimethanol and aliphatic glycols of the formula HO(CH$_2$)$_n$OH where n is an integer of 2 to 10. Up to 50 mole percent of the aromatic dicarboxylic acids can be replaced by at least one different aromatic dicarboxylic acid having from 8 to 14 carbon atoms, and/or up to 20 mole percent can be replaced by an aliphatic dicarboxylic acid having from 2 to 12 carbon atoms.

A high molecular weight polyester can be obtained preferably by solid state polymerization of a lower molecular weight polyester obtained by melt condensation.

Preferred polyesters include polyethylene terephthalate; poly(1,4-butylene) terephthalate; 1,4-cyclohexylene dimethylene terephthalate; 1,4-cyclohexylene dimethylene terephthalate/isophthalate copolymer; and other linear homopolymer esters derived from aromatic dicarboxylic acids and glycols. Preferred aromatic dicarboxylic acids include terephthalic; isophthalic; bibenzoic; naphthalane-dicarboxylic including the 1,5-,2,6-, and 2,7-naphthalenedicarboxylic acids; 4,4'diphenylenedicarboxylic acid; bis(p-carboxyphenyl) methane; ethylene-bis-p-benzoic acid; 1,4-tetramethylene bis(p-oxybenzoic) acid; ethylene bis(p-oxybenzoic) acid; and 1,3-trimethylene bis(p-oxybenzoic) acid. Preferred glycols include those selected from the group consisting of 2,2-dimethyl-1,3-propane diol; cyclohexane dimethanol; and aliphatic glycols of the general formula HO(CH$_2$)$_n$OH where n is an integer from 2 to 10, e.g., ethylene glycol; 1,3-trimethylene glycol; 1,4-tetramethylene glycol; 1,6-hexamethylene glycol; 1,8-octamethylene glycol; 1,10-decamethylene glycol; 1,3-propylene glycol; and 1,4-butylene glycol. Up to 20 mole percent, as indicated above, of preferably adipic, sebacic, azelaic, dodecanedioic acid or 1,4-cyclohexanedicarboxylic acid can be present.

More preferred polyesters are based on polyethylene terephthalate homopolymers, polybutylene terephthalate homopolymers, polyethylene terephthalate/polybutylene terephthalate copolymers, polyethylene terephthalate copolymers, polyethylene terephthalate/polybutylene terephthalate mixtures and/or mixtures thereof, although any other polyesters can be used as well, either alone or in any combination with any of the polyesters described herein. Even more preferred as the polyester is polybutylene terephthalate which has not been solid state polymerized.

Preferred polyesters also include copolyetherester(s) (also herein referred to as copolyetherester elastomers or copolyetherester polymers), which are now described.

In a preferred embodiment, the copolyetherester elastomer(s) have a multiplicity of recurring long-chain ester units and short-chain ester units joined head-to-tail through ester linkages, said long-chain ester units being represented by the formula:

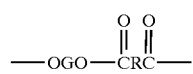

(I)

and said short-chain ester units being represented by the formula:

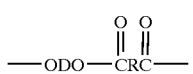

(II)

wherein

G is a divalent radical remaining after the removal of terminal hydroxyl groups from a poly(alkylene oxide) glycol having an average molecular weight of about 400–3500;

R is a divalent radical remaining after removal of carboxyl groups from a dicarboxylic acid having a molecular weight less than about 300;

D is a divalent radical remaining after removal of hydroxyl groups from a diol having a molecular weight less than about 250;

wherein said copolyetherester(s) contain from about 25 to about 99 weight percent short-chain ester units.

As used herein, the term "long-chain ester units" as applied to units in a polymer chain refers to the reaction product of a long-chain glycol with a dicarboxylic acid. Suitable long-chain glycols are poly(alkylene oxide) glycols having terminal (or as nearly terminal as possible) hydroxy groups and having a molecular weight of from about 400 to about 3500, particularly from about 600 to about 2300. Preferred poly(alkylene oxide) glycols include poly(tetramethylene oxide) glycol, poly(trimethylene oxide) glycol, poly(propylene oxide) glycol, poly(ethylene oxide glycol, copolymer glycols of these alkylene oxides, and block copolymers such as ethylene oxide-capped poly(propylene oxide) glycol. Mixtures of two or more of these glycols can be used.

The term "short-chain ester units" as applied to units in a polymer chain of the copolyetheresters refers to low molecular weight compounds or polymer chain units having molecular weights less than about 550. They are made by reacting a low molecular weight diol or a mixture of diols (MW below about 250) with a dicarboxylic acid to form ester units represented by Formula (II) above.

Included among the low molecular weight diols which react to form short-chain ester units suitable for use for preparing copolyetheresters are acyclic, alicyclic and aromatic dihydroxy compounds. Preferred compounds are diols with 2–15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2–8 carbon atoms, most especially 1,4-butanediol. Included among the bisphenols which can be used are bis(p-hydroxy)diphenyl, bis(p-hydroxyphenyl)methane, and bis(p-hydroxyphenyl) propane. Equivalent ester-forming derivatives of diols are also useful (e.g., ethylene oxide or ethylene carbonate can be used in place of ethylene glycol or resorcinol diacetate can be used in place of resorcinol).

The term "low molecular weight diols" as used herein should be construed to include such equivalent ester-forming derivatives; provided, however, that the molecular weight requirement pertains to the diol and not to its derivatives.

Dicarboxylic acids which are reacted with the foregoing long-chain glycols and low molecular weight diols to produce the copolyetheresters are aliphatic, cycloaliphatic or aromatic dicarboxylic acids of a low molecular weight, i.e., having a molecular weight of less than about 300. The term "dicarboxylic acids" as used herein includes acid equivalents of dicarboxylic acids having two functional carboxyl groups which perform substantially like dicarboxylic acids in reaction with glycols and diols in forming copolyetherester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyetherester polymer formation and use of the polymer in the compositions of this invention.

The term "aliphatic dicarboxylic acids", as used herein, means carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used are sebacic acid, 1,3-cyclohexane dicarboxylic acid, 1,4-cyclohexane dicarboxylic acid, adipic acid, glutaric acid, 4-cyclohexane-1,2-dicarboxylic acid, 2-ethylsuberic acid, cyclopentanedicarboxylic acid decahydro-1,5-naphthylene dicarboxylic acid, 4,4,'-bicyclohexyl dicarboxylic acid, decahydro-2,6-naphthylene dicarboxylic acid, 4,4,'-methylenebis(cyclohexyl) carboxylic acid, 3,4-furan dicarboxylic acid. Preferred acids are cyclohexanedicarboxylic acids and adipic acid.

Representative aromatic dicarboxylic acids include phthalic, terephthalic and isophthalic acids, bibenzoic acid, substituted dicarboxy compounds with two benzene nuclei such as bis(p-carboxyphenyl)methane, p-oxy-1,5-naphthalene dicarboxylic acid, 2,6-naphthalene dicarboxylic acid, 2,7-naphthalene dicarboxylic acid, 4,4,'-sulfonyl dibenzoic acid and $C_1$–$C_{12}$ alkyl and ring substitution derivatives thereof, such as halo, alkoxy, and aryl derivatives. Hydroxyl acids such as p-(beta-hydroxyethoxy)benzoic acid can also be used providing an aromatic dicarboxylic acid is also present.

Aromatic dicarboxylic acids are a preferred class for preparing the copolyetherester polymers useful for this invention. Among the aromatic acids, those with 8–16 carbon atoms are preferred, particularly terephthalic acid alone or with a mixture of phthalic and/or isophthalic acids.

The copolyetheresters preferably contain about 25–99 weight percent short-chain ester units corresponding to Formula (II) above, the remainder being long-chain ester units corresponding to Formula (I) above. The copolyetheresters more preferably contain about 40–95, and even more preferably about 60–90, weight percent short-chain ester units the remainder being long-chain ester units. In general, as percent short-chain ester units in the copolyetherester are increased, the polymer has a higher tensile strength and modulus, and the moisture vapour transmission rate decreases. Most preferably, at least about 70% of the groups represented by R in Formulae (I) and (II) above are 1,4-phenylene radicals and at least about 70% of the groups represented by D in Formula (II) above are 1,4-butylene radicals and the sum of the percentages of R groups which are not 1,4-phenylene radicals and D groups which are not 1,4-butylene radicals does not exceed 30%. If a second dicarboxylic acid is used to make the copolyetherester, isophthalic acid is the acid of choice and if a second low molecular weight diol is used, 1,4-butenediol or hexamethylene glycol are the diols of choice.

A blend or mixture of two or more copolyetherester elastomers can be used. The copolyetherester elastomers used in the blend need not on an individual basis come within the values disclosed hereinbefore for the elastomers. However, the blend of two or more copolyetherester elastomers must conform to the values described herein for the copolyetheresters on a weighted average basis. For example, in a mixture that contains equal amounts of two copolyetherester elastomers, one copolyetherester can contain 60 weight percent short-chain ester units and the other copolyetherester can contain 30 weight percent short-chain ester units for a weighted average of 45 weight percent short-chain ester units.

Preferably, the copolyetherester elastomers are prepared from esters or mixtures of esters of terephthalic acid and isophthalic acid, 1,4-butanediol and poly(tetramethylene ether)glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyetherester elastomers are prepared from esters of terephthalic acid, e.g. dimethylterephthalate, 1,4-butanediol and poly(tetramethylene ether)glycol.

The dicarboxylic acids or their derivatives and the polymeric glycol are preferably incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of glycol incorporated is still the difference between moles of diacid and polymeric glycol.

The copolyetherester elastomers described herein can be made conveniently by a conventional ester interchange reaction. A preferred procedure involves heating the ester of an aromatic acid, e.g., dimethyl ester of terephthalic acid, with the poly(alkylene oxide)glycol and a molar excess of the low molecular weight diol, 1,4-butanediol, in the presence of a catalyst at 150–160° C., followed by distilling off methanol formed by the interchange reaction. Heating is continued until methanol evolution is complete. Depending on temperature, catalyst and glycol excess, this polymerization is complete within a few minutes to a few hours. This product results in the preparation of a low molecular weight prepolymer which can be carried to a high molecular weight copolyetherester by the procedure described below. Such prepolymers can also be prepared by a number of alternate esterification or ester interchange processes; for example, the long-chain glycol can be reacted with a high or low molecular weight short-chain ester homopolymer or copolymer in the presence of catalyst until randomization occurs. The short-chain ester homopolymer or copolymer can be prepared by ester interchange from either the dimethyl esters and low molecular weight diols as above, or from the free acids with the diol acetates. Alternatively, the short-chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long-chain glycol.

The resulting prepolymer is then carried to high molecular weight by distillation of the excess of short-chain diol. This process is known as "polycondensation". Additional ester interchange occurs during this distillation to increase the molecular weight and to randomize the arrangement of the copolyetherester units. Best results are usually obtained if this final distillation or polycondensation is run at less than 1 mm pressure and 240°–260° C. for less than 2 hours in the presence of antioxidants such as 1,6-bis-(3,5-di-tert-butyl-4-hydroxyphenol)propionamido]-hexane or 1,3,5-trimethyl-2,4,6-tris[3,5-ditertiary-butyl-4-hydroxybenzyl]benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol, are conveniently removed during polymerization by azeotropic distillation. Other special polymerization techniques for example, interfacial polymerization of bisphenol with bisacylhalides and bisacylhalide capped linear diols, may be useful for preparation of specific polymers. Both batch and continuous methods can be used for any stage of copolyetherester polymer preparation. Polycondensation of prepolymer can also be accomplished in the solid phase by heating finely divided solid prepolymer in a vacuum or in a stream of inert gas to remove liberated low molecular weight diol. This method is believed to have the advantage of reducing degradation because it is used at temperatures below the softening point of the prepolymer where the degradation rate is much slower relative to the polymerization rate. The major disadvantage is the long time required to reach a given degree of polymerization.

Boron Component

Polymer compositions of our invention comprise a boron component preferably comprising boron oxide, boric acid, borate salt, or any mixtures of one or more of any of the foregoing.

The boron component comprises preferably between about 0.01 and 5 weight percent of the composition, more preferably between about 0.02 and 0.3 weight percent of the composition, and even more preferably between about 0.03 and 0.1 weight percent of the composition; other alternative preferred ranges are between about 0.05 and about 1 weight percent of the composition, and even more preferably between about 0.1 and about 0.5 weight percent of the composition.

More preferably, the boron component comprises boric acid, borate salt, or any mixtures of one or more of any of the foregoing. Even more preferably, the boron component comprises at least one borate salt.

As used herein, "borate salt" (or simply "borate") means the salt of a boric acid. There are different boric acids, including metaboric acid ($HBO_2$), orthoboric acid ($H_3BO_3$), tetraboric acid ($H_2B_4O_7$), and pentaboric acid ($HB_5O_9$). Each of these acids can be converted to a salt by reaction with a base. Different bases can be used to make different borates. These include amino compounds which give ammonium borates, and hydrated metal oxides such as sodium hydroxide which gives sodium borates. These borates may be anhydrous, or they may be hydrated. For example, sodium tetraborate is available in the anhydrous form, and also as the pentahydrate and the decahydrate.

Preferred borate salts are alkali metal borates, with sodium, lithium, and potassium being preferred, and with sodium tetraborate being especially preferred.

Other preferred metal borates are divalent metal borates, with alkaline earth metal borates being preferred, in particular calcium and magnesium. Trivalent metal borates, such as aluminum borate, may also be used.

Epoxy Component

Polymer compositions of our invention comprise an epoxy component.

The epoxy component comprises an amount sufficient to provide preferably about 5 to 500 millequivalents (MEQ), more preferably about 10 to 300 millequivalents (MEQ), more preferably about 15 to 200 millequivalents (MEQ), and even more preferably about 20 to 150 milliequivalents (MEQ), of total epoxy function per kg of total polyester in the composition.

By equivalents herein is meant the number of "moles" of epoxy functional group added.

Preferably, the epoxy component comprises one or more of epoxy polymers and/or epoxy compounds.

A preferred epoxy polymer is a diphenolic epoxy condensation polymer. As used herein, "diphenolic epoxy condensation polymer" means a condensation polymer having epoxy functional groups, preferably as end groups, and a diphenol moiety within the polymer. Such diphenolic epoxy condensation polymers are well-known to one of ordinary skill in the art.

A preferred diphenolic epoxy condensation polymer is the following:

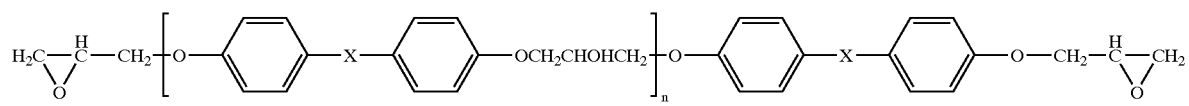

where n=1–16; and

X is —; —C(CH$_3$)$_2$—; —SO$_2$—; —C(CF$_3$)$_2$—; —CH$_2$—; —CO—; or —CCH$_3$C$_2$H$_5$—.

n represents an average and therefore need not be a whole number; X may be the same throughout the polymer or may change throughout the polymer. Preferably, X is —C(CH$_3$)$_2$.

Preferred diphenolic epoxy condensation polymers include condensation polymers of epichlorohydrin with a diphenolic compound. Also preferred is a 2,2-bis(p-glycidyloxyphenyl) propane condensation product with 2,2-bis(p-hydroxyphenyl)propane and similar isomers.

Preferred commercially available diphenolic epoxy condensation polymers include the EPON® 1000 series of resins (1001 F-1009F), available from Shell Chemical Co. Particularly preferred are EPON® 1001F, EPONS 1002F, and EPON® 1009F.

A preferred epoxy compound comprises a compound comprising at least two epoxy groups per molecule of the compound, more preferably at least three epoxy groups per molecule of the compound, and more preferably at least four epoxy groups per molecule of the compound. Even more preferably, this compound comprises between two and four epoxy groups per molecule of the compound. The epoxy groups of this compound preferably comprise glycidyl ethers, and even more preferably, glycidyl ethers of phenolic compounds. This compound may be polymeric or non-polymeric, with non-polymeric being preferred. A preferred commercially available embodiment is EPON® 1031 (available from Shell Chemical Co.), which is believed to be primarily a tetraglycidyl ether of tetra (parahydroxyphenyl) ethane.

Another preferred embodiment of the epoxy component is what I shall refer to as an "epoxy system". The epoxy system comprises (i) diphenolic epoxy condensation polymer ("first part of the epoxy system") and (ii) at least one epoxy compound comprising at least two epoxy groups per molecule of the epoxy compound ("second part of the epoxy system").

The first part of the epoxy system comprises the preferred diphenolic epoxy condensation polymer, as described above, of which the EPON® 1000 series of resins are preferred commercially available embodiments. The second part of the epoxy system comprises the other preferred epoxy compounds, also described above, of which EPON® 1031 is a preferred commercially available embodiment.

The epoxy compound(s) of the second part of the epoxide system is/are different from the diphenolic epoxy condensation polymers used in the first part of the epoxy system and may be polymeric or non-polymeric. Preferably, the epoxy compound is non-polymeric.

Preferably, the epoxy system comprises about 5 to 500 millequivalents (MEQ) of total epoxy function per kg of total polyester in the composition.

More preferably, the epoxy system comprises about 10 to 300 millequivalents (MEQ) of total epoxy function per kg of total polyester in the composition.

Even more preferably, the epoxy system comprises about 15 to 200 millequivalents (MEQ) of total epoxy function per kg of total polyester in the composition.

Even more preferably, the epoxy system comprises about 20 to 150 millequivalents (MEQ) of total epoxy function per kg of total polyester in the composition.

With respect to any of the above preferred ranges, the second part of the epoxy system provides preferably about 1 to about 99% of the total epoxy function, more preferably about 1 to about 80% of the total epoxy function, more preferably about 1 to about 60% of the total epoxy function, even more preferably about 10 to about 75% of the total epoxy function, and most preferably about 20 to about 50% of the total epoxy function.

Optional Components

Conventional additives may be added to the polymer compositions of our invention. For instance, a flame retardant and flame-retardant synergist may be added for the purpose of improving flame retardancy, and an antioxidant and heat stabilizer may be added for the purpose of improving heat resistance and preventing discoloration. Other additives include fillers, inert fillers, reinforcing agents, impact modifiers, viscosity modifiers, nucleating agents, colorants and dyes, lubricants, plasticizers, mold-releasing agents, and UV stabilizers.

Polymer compositions of our invention can be obtained by blending all of the component materials using any blending method. These blending components in general are preferably made homogeneous as much as possible. As a specific example, all of the component materials are mixed to homogeneity using a mixer such as a blender, kneader, Banbury mixer, roll extruder, etc. to give a resin composition. Or, part of the materials may be mixed in a mixer, and the rest of the materials may then be added and further mixed until homogeneous. Alternatively, the materials may be dry-blended in advance, and a heated extruder is then used to melt and knead until homogeneous, and then to extrude in a strand shape, followed by cutting to a desirable length to become granulates.

Polymer compositions of our invention may be used alone as molding pellets or mixed with other polymers. The pellets may be used to produce fibers, films, and coatings as well as injection molded or extruded articles, particularly for end use applications where hydrolysis resistance is desired, for example, tubing, cable jackets, molded appliance parts, and molded interior automotive parts, wire jacketing, loose buffer tubing for optical fiber cables, and molded parts used in higher humidity use environments.

Molding of the polymer compositions of our invention into articles can be carried out according to methods known to those skilled in the art. Preferred are generally utilized molding methods such as injection molding, extruding molding, pressing molding, foaming molding, blow molding, vacuum molding, injection blow molding, rotation molding, calendar molding and solution casting molding.

EXAMPLES

The following Examples 1–11 illustrate preferred embodiments of our invention. Our invention is not limited to these Examples.

Examples 1–4

Each composition used in Examples 1–4 contained the following, with all percentages being in weight percent (unless otherwise indicated) as shown below or in the tables:

1. balance, Polybutylene terephthalate (PBT) prepared from PBT made by standard polymerization to an inherent viscosity of 0.60. This PBT is then solid state polymerized to an inherent viscosity of 1.25. All inherent viscosities are run at 19 degrees C. at a concentration of 0.40 g PBT/100 ml solution in 1:1 by weight trifluoroacetic acid:methylene chloride.

2. 0.5%, Pentaerythritol Tetrastearate (available from Henkel, Inc.).

3. 0.3%, Irganox® 1010 (available from Ciba-Geigy).
4. Unless otherwise indicated, 2.3%, EPON® 1001F (available from Shell Chemical Co.)—an epichlorohydrin/bisphenol A condensation product having an average epoxy equivalent weight (EEW) of 538. Example 4 also used EPON® 1031 (available from Shell Chemical Co.), which is believed to be primarily a tetraglycidyl ether of tetra (parahydroxyphenyl) ethane and to have an epoxide equivalent weight of 212.
5. Indicated in tables, sodium tetraborate, anhydrous powder (available from Sigma-Aldrich).

The polyester compositions were prepared by dry blending all the ingredients in a plastic bag, and then compounding the blend on a 28/30 mm Werner and Pfleiderer twin screw extruder, set up in the 30 mm bilobal configuration with vacuum extraction and using a moderately hard-working screw design. Barrel temperatures were set at 270 degrees C. and screw speed was 250 RPM. Extrusion rate was 20 to 30 lbs/hr and melt temperature was 290 to 295 degrees C.

The melt exited a two-hole strand die and was cut into pellets. The pellets were dried for about 16 hours in a desiccated circulating air oven and molded into ⅛" thick ASTM D638 Type 1 tensile test bars and ⅛" thick×½" wide "Flex" bars on a 6 ounce Van Dorn reciprocating screw injection molding machine using a 270 degree C. barrel temperature, 60 RPM screw speed, 80 degree C. mold temperature, and a 30–35 second overall cycle.

Tensile properties were run according to ASTM D 638 at a crosshead speed of 2.0 inches/minute. Elongation was measured using an extensometer, except that, when it exceeded the range of the extensometer (about 5%), calipers were used.

Notched Izod Impact was run according to ASTM D 256, using ⅛" thick×½" wide test bars.

Hydrolysis resistance was determined by exposing tensile bars for 100 hours in steam using a pressure cooker at 121 degrees C., which gave a pressure of 14.7 psi gage. The tables below refer to this test as the "PCT" or "pressure cooker test." The exposed bars were then held at ambient conditions for at least 16 hours and tensile properties were determined as above. Results were compared with those "as molded" to calculate % retention of tensile strength and elongation.

Melt viscosities and melt viscosity stability were run on resin samples that were dried at least 16 hours at 110 degrees C. in a vacuum oven with nitrogen bleed. A Kayeness Galaxy V, Model 8052 constant rate rheometer was used for this purpose. The orifice was 0.040" in diameter×0.800" long. The tests were run at 260 degrees C. and a shear rate of 1216 sec$^{-1}$. Viscosities were measured 5 minutes (=hold up time (HUT)) after the resin had been introduced into the rheometer barrel and also at 10, 15, 20, 25 and 30 minutes. Melt stabilities were calculated as the ratio of melt viscosities after 20, 25 and 30 minutes to that measured after 5 minutes.

A comparative example, containing no sodium borate, was run with respect to Examples 1–4. The average results of five such runs are shown in Table 1 below. As with all the Examples 1–4, 2.3% EPON® 1001F (2.0% for Ex. 4.3 and Ex. 4.4) in combination with the boron component was used to improve hydrolysis resistance. If the EPON® 1001 F is not included, the test bars are too brittle to be tested after 100 hours in the pressure cooker test (PCT).

Example 1

Examples 1.1–1.5, included in Table 1 below, used the anhydrous sodium tetraborate powder as received.

TABLE 1

| | EXAMPLE | | | | | |
|---|---|---|---|---|---|---|
| | COMPARATIVE | 1.1 | 1.2 | 1.3 | 1.4 | 1.5 |
| % Na Borate Powder | 0.0 | 3.0 | 1.0 | 0.3 | 0.5 | 0.7 |
| TENSILE STR., KPSI: | | | | | | |
| INITIAL | 8.85 | 6.32 | 6.51 | 7.11 | 7.17 | 6.26 |
| 100 HRS PCT | 2.06 | 3.54 | 3.71 | 1.58 | 3.77 | 3.60 |
| % RETENTION | 23.3 | 56.0 | 57.0 | 22.2 | 52.6 | 57.5 |
| % ELONGATION: | | | | | | |
| INITIAL | 58.00 | 2.00 | 6.60 | 1.95 | 2.36 | 2.24 |
| 100 HRS PCT | 0.64 | 2.27 | 2.44 | 0.54 | 1.37 | 1.28 |
| % RETENTION | 1.1 | 113.5 | 37.0 | 27.7 | 58.1 | 57.1 |
| NOTCHED IZOD | 0.73 | 0.73 | 0.66 | 0.68 | 0.54 | 0.61 |
| MELT VISC. Pa.sec: | | | | | | |
| (260° C., 1216 sec−1) | | | | | | |
| 5 min HUT | 201 | 292 | 293 | 203 | 222 | 230 |
| 10 min | 174 | 328 | 282 | 190 | 212 | 221 |
| 15 min | 158 | 395 | 282 | 184 | 209 | 219 |
| 20 min | 148 | 459 | 301 | 181 | 214 | 225 |
| 25 min | 143 | 597 | 336 | 184 | 236 | 245 |
| 30 min | 140 | 743 | 427 | 195 | 282 | 303 |
| RATIO 20 MIN/5 MIN | 0.74 | 1.57 | 1.03 | 0.89 | 0.96 | 0.98 |
| RATIO 25 MIN/5 MIN | 0.71 | 2.04 | 1.15 | 0.91 | 1.06 | 1.07 |
| RATIO 30 MIN/5 MIN | 0.70 | 2.54 | 1.46 | 0.96 | 1.27 | 1.32 |

Example 2

For these Examples 2.1–2.5, included in Table 2 below, the sodium tetraborate powder was micronized to a mean particle size of 3 to 4 microns by multiple passes through a jet mill.

TABLE 2

| | EXAMPLE | | | | |
|---|---|---|---|---|---|
| | 2.1 | 2.2 | 2.3 | 2.4 | 2.5 |
| % MICRONIZED Na BORATE | 0.05 | 0.05 | 0.05 | 0.05 | 0.10 |
| TENSILE STR., KPSI: | | | | | |
| INITIAL | 8.11 | 8.41 | 8.42 | 8.60 | 8.57 |
| 100 HRS PCT | 4.66 | 6.37 | 4.62 | 4.85 | 5.58 |
| % RETENTION | 57.5 | 75.7 | 54.9 | 56.4 | 65.1 |
| % ELONGATION: | | | | | |
| INITIAL | 3.5 | 62.0 | 33.0 | 48.0 | 61.0 |
| 100 HRS PCT | 1.39 | 2.26 | 1.49 | 1.40 | 1.66 |
| % RETENTION | 40.3 | 3.6 | 4.5 | 2.9 | 2.7 |
| NOTCHED IZOD | 0.76 | 1.29 | 1.21 | 0.87 | 0.86 |
| MELT VISC. Pa.sec: (260° C., 1216 sec−1) | | | | | |
| 5 min HUT | 225 | 264 | 277 | 248 | 262 |
| 10 min | 214 | 254 | 268 | 245 | 268 |
| 15 min | 220 | 252 | 280 | 256 | 284 |
| 20 min | 247 | 262 | 322 | 283 | 300 |
| 25 min | 282 | 294 | 368 | 337 | 336 |
| 30 min | 338 | 372 | 405 | 414 | 407 |
| RATIO 20 MIN/5 MIN | 1.10 | 0.99 | 1.16 | 1.14 | 1.15 |
| RATIO 25 MIN/5 MIN | 1.25 | 1.11 | 1.33 | 1.36 | 1.28 |
| RATIO 30 MIN/5 MIN | 1.50 | 1.41 | 1.46 | 1.67 | 1.55 |

Example 3

In order to facilitate handling and obtain more even distribution of the micronized sodium tetraborate, it was made into a 5% concentrate in PBT, and this concentrate was used in Examples 3.1–3.6, as shown in Table 3 below.

TABLE 3

| | EXAMPLE | | | | | |
|---|---|---|---|---|---|---|
| | 3.1 | 3.2 | 3.3 | 3.4 | 3.5 | 3.6 |
| % CONCENTRATE | 0.20 | 0.60 | 1.00 | 2.00 | 1.00 | 2.00 |
| (% SODIUM BORATE) | 0.010 | 0.030 | 0.050 | 0.100 | 0.050 | 0.100 |
| TENSILE STR., KPSI: | | | | | | |
| INITIAL | 8.78 | 8.76 | 8.69 | 8.28 | 8.76 | 8.76 |
| 100 HRS PCT | 2.18 | 4.36 | 4.68 | 5.74 | 3.29 | 5.81 |
| % RETENTION | 24.8 | 49.8 | 53.9 | 69.3 | 37.6 | 66.3 |
| % ELONGATION: | | | | | | |
| INITIAL | 23 | 54 | 31 | 28 | 26 | 47 |
| 100 HRS PCT | 0.55 | 1.40 | 1.49 | 2.23 | 1.33 | 2.33 |
| % RETENTION | 2.4 | 2.6 | 4.8 | 8.0 | 5.1 | 5.0 |
| NOTCHED IZOD | 0.64 | 0.61 | 0.63 | 0.64 | 0.61 | 0.70 |
| MELT VISC. Pa.sec: (260° C., 1216 sec−1) | | | | | | |
| 5 min HUT | 205 | 216 | 233 | 234 | 209 | 234 |
| 10 min | 188 | 206 | 230 | 275 | 206 | 234 |
| 15 min | 181 | 216 | 255 | 304 | 205 | 246 |
| 20 min | 181 | 232 | 270 | 326 | 213 | 277 |
| 25 min | 191 | 247 | 294 | 395 | 234 | 309 |
| 30 min | 199 | 296 | 370 | 491 | 290 | 371 |
| RATIO 20 MIN/5 MIN | 0.88 | 1.07 | 1.16 | 1.39 | 1.02 | 1.18 |
| RATIO 25 MIN/5 MIN | 0.93 | 1.14 | 1.26 | 1.69 | 1.12 | 1.32 |
| RATIO 30 MIN/5 MIN | 0.97 | 1.37 | 1.59 | 2.10 | 1.39 | 1.59 |

Example 4

The compositions used for Example 4, as shown below in Table 4, are similar to those of Example 3, except that in Ex. 4.3 and 4.4, the EPON® 1001F level was reduced to 2.0%, and 1.0% of EPON® 1031 was added. Referring to Table 4, inter alia, the added EPON® 1031 substantially improved the tensile strength and elongation after 100 hours in the PCT. This change also decreased melt viscosity stability somewhat, although certainly not to such a degree that subsequent processing would be substantially affected.

TABLE 4

| | EXAMPLE | | | |
|---|---|---|---|---|
| | Ex. 4.1 | Ex. 4.2 | Ex. 4.3 | Ex. 4.4 |
| % CONCENTRATE | 1.00 | 2.00 | 2.00 | 1.00 |
| (% SODIUM BORATE) | 0.050 | 0.100 | 0.100 | 0.050 |
| % EPON ® 1001F | 2.30 | 2.30 | 2.00 | 2.00 |
| % EPON ® 1031 | 0.00 | 0.00 | 1.00 | 1.00 |
| TENSILE STR., KPSI: | | | | |
| INITIAL | 8.76 | 8.76 | 8.72 | 8.74 |
| 100 HRS PCT | 3.29 | 5.81 | 6.99 | 6.95 |
| % RETENTION | 37.6 | 66.3 | 80.2 | 79.5 |
| % ELONGATION: | | | | |
| INITIAL | 26 | 47 | 72 | 38 |
| 100 HRS PCT | 1.33 | 2.33 | 5.60 | 5.40 |
| % RETENTION | 5.1 | 5.0 | 7.8 | 14.2 |
| NOTCHED IZOD | 0.61 | 0.70 | 0.69 | 0.70 |
| MELT VISC. Pa.sec: (260° C., 1216 sec−1) | | | | |
| 5 min HUT | 209 | 234 | 243 | 225 |
| 10 min | 206 | 234 | 259 | 223 |
| 15 min | 205 | 246 | 317 | 241 |
| 20 min | 213 | 277 | 376 | 271 |
| 25 min | 234 | 309 | 491 | 305 |
| 30 min | 290 | 371 | 551 | 407 |
| RATIO 20 MIN/5 MIN | 1.02 | 1.18 | 1.55 | 1.20 |
| RATIO 25 MIN/5 MIN | 1.12 | 1.32 | 2.02 | 1.36 |
| RATIO 30 MIN/5 MIN | 1.39 | 1.59 | 2.27 | 1.81 |

Examples 5–11

The materials used in Examples 5–11 were:
PBT: thermoplastic polybutylene terephthalate having a weight average molecular weight of 50,000 and an inherent viscosity of 1.07 dl/g (0.4 g/100 ml 50/50 methylene chloride/trifluoroacetic acid at 19° C.).
PEE A: segmented copolyetherester containing 38 wt % 1,4-butylene terephthalate and 11 wt % 1,4-butylene isophthalate short chain ester units, and long chain ester units derived from the terephthalate and isophthalate esters of poly(tetramethylene ether)glycol having a number average molecular weight of about 1,000. PEE A has a Shore D hardness of 40 D.

PEE B: segmented copolyetherester containing 45 wt % 1,4-butylene terephthalate short chain ester units and long chain ester units derived from poly(tetramethylene ether)glycol having a number average molecular weight of about 1,400. PEE B has a Shore D hardness of 45 D.

PEE C: segmented copolyetherester containing 70 wt % 1,4-butylene terephthalate short chain ester units and long chain ester units derived from poly(tetramethylene ether)glycol having a number average molecular weight of about 1,000. PEE B has a Shore D hardness of 63 D.

CB: concentrate of 25% of carbon black in PEE A.

Epoxy:

Four different grades of EPON® epoxies were used. These are all different glycidyl epoxide ethers, but they differ in the chemical structure, and in the epoxide equivalent weight. The EPON® 1009F is believed to have an epoxide equivalent weight of 3050; the EPON® 1002F is believed to have an epoxide equivalent weight of 650; the EPON® 1001 F is believed to have an epoxide equivalent weight of 538; and the EPON® 1031 is believed to have an epoxide equivalent weight of 212. In general, at lower epoxide equivalent weight, there is more epoxide functionality on a weight basis. These EPON® epoxies are all available from Shell.

Borates:

Anhydrous Sodium Tetraborate (available from VWR Scientific Products, West Chester, Pa.).

Sodium Borate Decahydrate (available from US Borax Inc., Hoffman Estates, Ill.)

Sodium Borate Decahydrate "20 Mule Team Borax" (obtained from local Acme chain grocery store, Wilmington, Del.)

Potassium Tetraborate Tetrahydrate (available from Sigma, St. Louis, Mo.)

Lithium Tetraborate (available from Sigma)

Lithium Metaborate (available from Sigma)

Potassium Pentaborate (from laboratory bottle, source unknown)

Magnesium Borate (available from Bodman, Aston, Pa.)

Aluminum Borate (available from Bodman)

Calcium Tetraborate (available from Bodman)

The anhydrous sodium tetraborate was received in granular form with an average particle size of about 1 mm and was micronized in a Vortac jet mill, model E12 with a powder auger to give anhydrous sodium tetraborate with a median particle size of 6 μm, which was used for most of the Examples. The other borate compounds that were used in the Examples were received as a finer particulate, and were further ground to give a smaller particle size with a mortar and pestle.

Polymer blends were prepared by premixing the ingredients in their proper proportions in a suitable vessel such as a drum or a plastic bag. The mixture was then melt blended in a 30 mm Werner and Pfleiderer twin screw extruder with a barrel temperature of 240° C., and a polymer melt temperature of 265° C. exiting the extruder. The compounded material exiting the die was quenched in water, surface water removed by compressed air and cut into pellets. The product was thoroughly dried in a vacuum oven, and was then molded into microtensile bars on a 6 ounce (170 g) Van Dorn machine with a nozzle temperature of 250° C. and a mold temperature of 30° C.

Tensile properties including tensile strength and elongation at break were determined on injection molded microdumbbell test bars according to ASTM D412, with a test speed of 50 cm/min.

Hydrolytic stability testing was preformed by placing the molded test samples in a Barnstead Laboratory Sterilizer. The sterilizer was operated at 125° C. and 18 psi (124 KPa) water vapor pressure above atmospheric pressure. The samples were typically exposed to these conditions for time periods of up to 8 days (192 hours) or more (288 hours). After this time, the samples were removed from the autoclave, allowed to cool, and tested for tensile properties. For comparison, tensile properties were also determined on samples prior to hydrolytic stability testing.

In Examples 5–11 and the tables contained therein, unless otherwise indicated, all of the amounts are given as percents by weight of each component in the final composition. Further, in the tables, "n/m" indicates that no measurement was taken for the particular entry.

Example 5

Example 5 compares the effect of using both a borate component and an epoxy component (Examples 5.1–5.9), compared to using only an epoxide component or neither component. (Comp. 5.1–5.6). Table 5A sets forth the tensile strength and elongation at break data for Examples 5.1–5.9, and Table 5B sets forth the tensile strength and elongation at break data for Comp. 5.15.6.

TABLE 5A

| Reference | Ex. 5.1 | Ex. 5.2 | Ex. 5.3 | Ex. 5.4 | Ex. 5.5 | Ex. 5.6 | Ex. 5.7 | Ex. 5.8 | Ex. 5.9 |
|---|---|---|---|---|---|---|---|---|---|
| PBT | 25 | 25 | 24.9 | 24.9 | 25 | 25 | 25 | 25 | 25 |
| PEE B | 68.9 | 68.9 | 68.8 | 70.8 | 70.9 | 63 | 53 | 70.9 | 67.5 |
| PEE A | | | | | | 7.9 | 15.8 | | |
| CB | 2 | 2 | 2 | 2 | 2 | 2 | 2 | 2 | 1.85 |
| EPON ® 1001F | 0 | 0 | 0 | 0 | 0 | 0 | 0 | 0 | 5.55 |
| EPON ® 1002F | 4 | 4 | 4 | 2 | 2 | 2 | 4 | 2 | 0 |
| Sodium Tetraborate, finely ground | 0.1 | 0.1 | 0.3 | 0.3 | 0.1 | 0.1 | 0.2 | 0.1 | 0.1 |
| TOTAL % | 100.0 | 100.0 | 100.0 | 100.0 | 100.0 | 100.0 | 100.0 | 100.0 | 100.0 |
| Original Tensile Strength psi | 3762 | 3600 | 3652 | 3703 | 3835 | 3717 | 3729 | 3625 | 3058 |
| Tensile Strength after 96 hours | 3039 | 3062 | 3110 | 2400 | 2565 | 2562 | 3301 | 1466 | n/m |
| Tensile Strength after 192 hours | 1611 | n/m | 2169 | 1206 | 1462 | 1210 | 1655 | n/m | 2953 |
| Tensile Strength after 288 hours | n/m | n/m | n/m | n/m | n/m | n/m | n/m | n/m | 764 |

TABLE 5A-continued

| Reference | Ex. 5.1 | Ex. 5.2 | Ex. 5.3 | Ex. 5.4 | Ex. 5.5 | Ex. 5.6 | Ex. 5.7 | Ex. 5.8 | Ex. 5.9 |
|---|---|---|---|---|---|---|---|---|---|
| Original Elongation at Break, % | 507 | 485 | 491 | 500 | 504 | 508 | 531 | 471 | 369 |
| Elongation at Break after 96 hours | 446 | 431 | 426 | 289 | 327 | 340 | 481 | 170 | n/m |
| Elongation at Break after 144 hours | n/m | 297 | n/m | n/m | n/m | n/m | n/m | 24 | n/m |
| Elongation at Break after 192 hours | 101 | n/m | 99 | 14 | 15 | 15 | 204 | n/m | 394 |
| Elongation at Break after 288 hours | n/m | n/m | n/m | n/m | n/m | n/m | n/m | n/m | 277 |

TABLE 5B

| Reference | Comp. 5.1 | Comp. 5.2 | Comp. 5.3 | Comp. 5.4 | Comp. 5.5 | Comp. 5.6 |
|---|---|---|---|---|---|---|
| PBT | 25 | 25 | 25 | 25 | 25 | 23.6 |
| PEE B | 75 | 73 | 71 | 69 | 71 | 68.9 |
| CB | 0 | 2 | 2 | 2 | 2 | 1.9 |
| EPON ® 1001F | 0 | 0 | 0 | 0 | 0 | 5.6 |
| EPON ® 1002F | 0 | 0 | 2 | 4 | 2 | 0 |
| TOTAL % | 100 | 100 | 100 | 100 | 100 | 100 |
| Original Tensile Strength psi | 3607 | 3613 | 3717 | 3719 | 3739 | 3578 |
| Tensile Strength after 96 hours | 1950 | 2370 | 1833 | 2064 | 1844 | n/m |
| Tensile Strength after 192 hours | 0 | 0 | 923 | 1023 | n/m | 1934 |
| Tensile Strength after 288 hours | n/m | n/m | n/m | n/m | n/m | 0 |
| Original Elongation at Break, % | 505 | 480 | 488 | 507 | 496 | 519 |
| Elongation at Break after 96 hours | 57 | 43 | 94 | 149 | 98 | n/m |
| Elongation at Break after 144 hours | n/m | n/m | n/m | n/m | 16 | n/m |
| Elongation at Break after 192 hours | 0 | 0 | 12 | 13 | n/m | 43 |
| Elongation at Break after 288 hours | n/m | n/m | n/m | n/m | n/m | 10 |

These results show the improved hydrolytic stability performance from a combination of the boron component and the epoxy component. The elongation at break values after 96 hours exposure are considerably higher for Exs. 5.4, 5.5, 5.6, and 5.8 compared to Comp. 5.3 and 5.5 with the same amount of EPON® 1002F but no boron component. Similarly, the elongation at break values after 96 hours exposure and after 192 hours exposure are much higher for Exs. 5.1, 5.3, and 5.7 compared to Comp. 5.4 with the same level of EPON® 1002F but no boron component. Also, the elongation at break values after 192 and after 288 hours are much higher for Ex. 5.8 than for Comp. 5.6 with the same level of EPON® 1001F but no boron component.

Example 6

Example 6 contains compositions having a borate component and different types of epoxy components, as set forth in Ex. 6.1–6.7 in Table 6 below. These are effective at improving the hydrolytic stability as can be seen from the high elongation at break values after 96 hours exposure.

TABLE 6

| Reference | Ex. 6.1 | Ex. 6.2 | Ex. 6.3 | Ex. 6.4 | Ex. 6.5 | Ex. 6.6 | Ex. 6.7 |
|---|---|---|---|---|---|---|---|
| PBT | 25 | 25 | 25 | 25 | 25 | 25 | 25 |
| PEE B | 71.2 | 69.6 | 67.9 | 62.9 | 71.57 | 72.23 | 70.23 |
| CB | 2 | 2 | 2 | 2 | 2 | 2 | 2 |
| EPON ® 1001F | 1.7 | 3.3 | 0 | 0 | 0 | 0 | 0 |
| EPON ® 1002F | 0 | 0 | 0 | 0 | 0 | 0 | 2 |
| EPON ® 1009F | 0 | 0 | 5 | 10 | 0 | 0 | 0 |
| EPON ® 1031 | 0 | 0 | 0 | 0 | 1.33 | 0.67 | 0.67 |
| Sodium Tetraborate, finely ground | 0.1 | 0.1 | 0.1 | 0.1 | 0.1 | 0.1 | 0.1 |
| TOTAL % | 100.0 | 100.0 | 100.0 | 100.0 | 100.0 | 100.0 | 100.0 |
| Original Tensile Strength psi | 3666 | 3688 | 3687 | 3485 | 3454 | 3570 | 3580 |
| Tensile Strength after 96 hours | 1759 | 3223 | 1591 | 2569 | 2555 | 1922 | 2930 |
| Tensile Strength after 192 hours | n/m | n/m | n/m | n/m | 1883 | 12 | 2310 |
| Original Elongation at Break, % | 479 | 498 | 480 | 492 | 482 | 500 | 508 |
| Elongation at Break after 96 hours | 209 | 460 | 129 | 328 | 306 | 165 | 421 |

TABLE 6-continued

| Reference | Ex. 6.1 | Ex. 6.2 | Ex. 6.3 | Ex. 6.4 | Ex. 6.5 | Ex. 6.6 | Ex. 6.7 |
|---|---|---|---|---|---|---|---|
| Elongation at Break after 144 hours | 32 | 363 | 26 | 137 | n/m | n/m | n/m |
| Elongation at Break after 192 hours | n/m | n/m | n/m | n/m | 22 | 11 | 93 |

Example 7

Example 7 contains examples of an "epoxy system" embodiment, as forth in Ex. 7.1–7.2 in Table 7 below. Table 7 also contains Comp. 7.1.

TABLE 7

| Reference | Comp. 7.1 | Ex. 7.1 | Ex. 7.2 |
|---|---|---|---|
| PBT | 100 | 0 | 1 |
| PEE B | 0 | 93.9 | 95.9 |
| EPON ® 1001F | 0 | 4 | 2 |
| EPON ® 1031 | 0 | 2 | 1 |
| Sodium Tetraborate, finely ground | 0 | 0.1 | 0.1 |
| TOTAL % | 100 | 100.0 | 100.0 |
| Original Tensile Strength psi | 3691 | 3513 | 3178 |
| Tensile Strength after 192 hours | 1487 | 2113 | 2253 |
| Tensile Strength after 288 hours | 0 | 1740 | 1420 |
| Original Elongation at Break, % | 886 | 788 | 920 |
| Elongation at Break after 192 hours | 81 | 486 | 318 |
| Elongation at Break after 288 hours | 0 | 584 | 93 |

Example 8

Example 8 contains compositions in which the particle size of the boron component is varied, as set forth in Ex. 8.1–8.4 in Table 8 below. As shown by Table 8, inter alia, higher elongation at break values are obtained after 96 hours exposure when finely ground sodium tetraborate is used.

TABLE 8

| Reference | Ex. 8.1 | Ex. 8.2 | Ex. 8.3 | Ex. 8.4 |
|---|---|---|---|---|
| PBT | 25 | 25 | 24.9 | 25 |
| PEE B | 70.9 | 70.9 | 70.6 | 70.9 |
| CB | 2 | 2 | 2 | 2 |
| EPON ® 1002F | 2 | 2 | 2 | 2 |
| Sodium Tetraborate, finely ground | 0.1 | 0 | 0 | 0 |
| Sodium Tetraborate, medium ground | 0 | 0 | 0 | 0.1 |
| Sodium Tetraborate, coarse ground | 0 | 0.1 | 0.5 | 0 |
| TOTAL % | 100.0 | 100.0 | 100.0 | 100.0 |
| Original Tensile Strength psi | 3560 | 3452 | 3343 | 3538 |
| Tensile Strength after 96 hours | 2522 | 2068 | 1648 | 2328 |
| Tensile Strength after 192 hours | 550 | 6 | n/m | 1263 |
| Original Elongation at Break, % | 457 | 440 | 430 | 454 |
| Elongation at Break after 96 hours | 307 | 137 | 104 | 123 |
| Elongation at Break after 144 hours | n/m | n/m | 28 | n/m |
| Elongation at Break after 192 hours | 11 | 0 | n/m | 14 |

Example 9

Example 9 contains compositions in which various different boron components are employed, as set forth in Ex. 9.1–9.3.3 in Table 9A below. Table 9B below contains comparative examples (Comp. 9.1–9.3). As shown by Tables 9A and 9B, inter alia, higher elongation at break values are achieved after 96 hours exposure, especially when alkali metal borates are used as the boron component.

TABLE 9A

| Reference | Ex. 9.1 | Ex. 9.2.1 | Ex. 9.2.2 | Ex. 9.2.3 | Ex. 9.2.4 | Ex. 9.3.1 | Ex. 9.3.2 | Ex. 9.3.3 |
|---|---|---|---|---|---|---|---|---|
| PBT | 25 | 25 | 25 | 25 | 25 | 25 | 25 | 25 |
| PEE B | 70.9 | 70.9 | 70.9 | 70.9 | 70.9 | 70.9 | 70.9 | 70.9 |
| CB | 2 | 2 | 2 | 2 | 2 | 2 | 2 | 2 |
| EPON ® 1002F | 2 | 2 | 2 | 2 | 2 | 2 | 2 | 2 |
| Sodium Tetraborate, finely ground | 0.1 | 0 | 0 | 0 | 0 | 0 | 0 | 0 |
| Lithium Tetraborate | 0 | 0.1 | 0 | 0 | 0 | 0 | 0 | 0 |
| Lithium Metaborate | 0 | 0 | 0.1 | 0 | 0 | 0 | 0 | 0 |
| Potassium Tetraborate | 0 | 0 | 0 | 0.1 | 0 | 0 | 0 | 0 |
| Potassium Pentaborate | 0 | 0 | 0 | 0 | 0.1 | 0 | 0 | 0 |
| Calcium Tetraborate | 0 | 0 | 0 | 0 | 0 | 0.1 | 0 | 0 |
| Magnesium Borate | 0 | 0 | 0 | 0 | 0 | 0 | 0.1 | 0 |
| Aluminum Borate | 0 | 0 | 0 | 0 | 0 | 0 | 0 | 0.1 |
| TOTAL % | 100.0 | 100.0 | 100.0 | 100.0 | 100.0 | 100.0 | 100.0 | 100.0 |
| Original Tensile Strength psi | 3820 | 3836 | 3765 | 3856 | 3860 | 3697 | 3816 | 3779 |

TABLE 9A-continued

| Reference | Ex. 9.1 | Ex. 9.2.1 | Ex. 9.2.2 | Ex. 9.2.3 | Ex. 9.2.4 | Ex. 9.3.1 | Ex. 9.3.2 | Ex. 9.3.3 |
|---|---|---|---|---|---|---|---|---|
| Tensile Strength after 96 hours | 1862 | 1758 | 1627 | 1879 | 2199 | 2082 | 2400 | 2400 |
| Tensile Strength after 192 hours | 667 | 1518 | 1453 | 0 | 938 | 0 | 0 | 0 |
| Original Elongation at Break, % | 511 | 510 | 506 | 513 | 512 | 490 | 494 | 489 |
| Elongation at Break after 96 hours | 235 | 195 | 145 | 157 | 190 | 108 | 51 | 70 |
| Elongation at Break after 192 hours | 12 | 16 | 15 | 0 | 12 | 0 | 0 | 0 |

TABLE 9B

| Reference | Comp. 9.1 | Comp. 9.2 | Comp. 9.3 |
|---|---|---|---|
| PBT | 25 | 25 | 25 |
| PEE B | 73 | 73 | 71 |
| CB | 2 | 2 | 2 |
| EPON® 1002F | 0 | 0 | 2 |
| TOTAL % | 100 | 100 | 100 |
| Original Tensile Strength psi | 3731 | 3842 | 3687 |
| Tensile Strength after 96 hours | 2353 | 1654 | 2452 |
| Tensile Strength after 192 hours | 0 | 0 | 0 |
| Original Elongation at Break, % | 488 | 504 | 485 |
| Elongation at Break after 96 hours | 40 | 39 | 64 |
| Elongation at Break after 192 hours | 0 | 0 | 0 |

Example 10

Example 10 contains examples of compositions which were direct injection molded blends of PEE C with concentrates of EPON® 1002F and sodium tetraborate in PEE A, as set forth in Ex. 10.1–10.4 in Table 10 below. These concentrates contained 79% of PEE A, 20% of EPON® 1002F (or 13.3% of EPON® 1002F and 6.7% of EPON® 1031), and 1% of finely ground sodium tetraborate. The compositions in Table 10 give the final compositions of the molded products. Table 10 also includes Comp. 10.1.

TABLE 10

| Reference | Comp. 10.1 | Ex. 10.1 | Ex. 10.2 | Ex. 10.3 | Ex. 10.4 |
|---|---|---|---|---|---|
| PEE C | 100 | 95 | 90 | 80 | 90 |
| PEE A | 0 | 3.95 | 7.9 | 15.8 | 7.9 |
| EPON® 1002F | 0 | 1 | 2 | 4 | 1.33 |
| EPON® 1031 | 0 | 0 | 0 | 0 | 0.67 |
| Sodium Tetraborate, finely ground | 0 | 0.05 | 0.1 | 0.2 | 0.1 |
| TOTAL % | 100 | 100.0 | 100.0 | 100.0 | 100.0 |
| Original Tensile Strength psi | 4746 | 4534 | 4421 | 3898 | 4362 |
| Tensile Strength after 48 hours | 3028 | 3640 | 3557 | n/m | 3284 |
| Tensile Strength after 96 hours | 900 | 2816 | 1573 | 2746 | 1816 |
| Tensile Strength after 192 hours | 0 | 0 | 0 | 1792 | 0 |
| Original Elongation at Break, % | 504 | 471 | 486 | 474 | 487 |

TABLE 10-continued

| Reference | Comp. 10.1 | Ex. 10.1 | Ex. 10.2 | Ex. 10.3 | Ex. 10.4 |
|---|---|---|---|---|---|
| Elongation at Break after 48 hours | 363 | 452 | 513 | n/m | 498 |
| Elongation at Break after 96 hours | 9 | 20 | 165 | 489 | 221 |
| Elongation at Break after 192 hours | 0 | 0 | 0 | 104 | 0 |

Example 11

Example 11 contains compositions containing sodium borate decahydrate, as set forth in Ex. 11.1–11.2 in Table 7 below.

TABLE 11

| Reference | Ex. 11.1 | Ex. 11.2 |
|---|---|---|
| PBT | 24.9 | 24.9 |
| PEE B | 70.9 | 70.9 |
| CB | 2 | 2 |
| EPON® 1002F | 2 | 2 |
| Sodium Tetraborate Decahydrate | 0.2 | 0.2 |
| TOTAL % | 100.0 | 100.0 |
| Original Tensile Strength psi | 3823 | 3851 |
| Tensile Strength after 96 hours | 2779 | 2694 |
| Tensile Strength after 192 hours | 1225 | 1510 |
| Original Elongation at Break, % | 491 | 505 |
| Elongation at Break after 96 hours | 349 | 372 |
| Elongation at Break after 192 hours | 13 | 17 |

While this invention has been described with respect to what is at present considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent formulations and functions.

We claim:

1. Polymer composition comprising:
   polyester comprising a copolyetherester and a polyester derived from at least one of a linear saturated condensation product of glycols and dicarboxylic acids, or a reactive derivative thereof;

boron component comprising an alkali metal borate, in an amount between about 0.02 and about 0.3 weight percent of said composition; and epoxy component, in an amount sufficient to provide about 5 to 500 milliequivalents of total epoxy function per kilogram of said polyester.

2. The composition of claim 1, wherein said copolyetherester is present in an amount more than said linear saturated condensation products.

3. The composition of claim 1, wherein said polyester comprises copolyetherester and polybutylene terephthalate.

* * * * *